US009692499B2

(12) United States Patent
Moffatt et al.

(10) Patent No.: US 9,692,499 B2
(45) Date of Patent: Jun. 27, 2017

(54) TERRESTRIAL BASED AIR-TO-GROUND COMMUNICATIONS SYSTEM AND RELATED METHODS

(71) Applicant: Harris Corporation, Melbourne, FL (US)

(72) Inventors: Christopher D. Moffatt, Palm Bay, FL (US); Kevin Carl Gustke, Melbourne, FL (US)

(73) Assignee: HARRIS CORPORATION, Melbourne, FL (US)

( * ) Notice: Subject to any disclaimer, the term of this patent is extended or adjusted under 35 U.S.C. 154(b) by 0 days.

(21) Appl. No.: 14/875,795

(22) Filed: Oct. 6, 2015

(65) Prior Publication Data

US 2016/0099769 A1 Apr. 7, 2016

Related U.S. Application Data

(60) Provisional application No. 62/060,227, filed on Oct. 6, 2014.

(51) Int. Cl.
*H04W 4/00* (2009.01)
*H04B 7/185* (2006.01)
*H04B 7/155* (2006.01)

(52) U.S. Cl.
CPC ....... *H04B 7/18506* (2013.01); *H04B 7/1555* (2013.01)

(58) Field of Classification Search
CPC .......................... H04B 7/1555; H04B 7/18506
(Continued)

(56) References Cited

U.S. PATENT DOCUMENTS 7,813,433 B2  10/2010  Moffat
8,160,166 B2   4/2012  Moffat et al.
(Continued)

FOREIGN PATENT DOCUMENTS

DE  WO 2010025997 A1 *  3/2010  ............ H04B 7/185
EP  2408243              7/2010
(Continued)

OTHER PUBLICATIONS

ETSI TR 101 599 V.1.1.1. Technical Report "Electromagnetic compatibility and Radio spectrum Matters (ERM); System Reference document (SRdoc); Broadband Direct-Air-to-Ground Communications System employing beamforming antennas, operating in the 2,4 GHz and 5,8 GHz bands" Jul. 2012: pp. 31. www.etsi.org/deliver/etsi_tr/103100.../tr_103108v010101p.pdf.
(Continued)

*Primary Examiner* — Babar Sarwar
(74) *Attorney, Agent, or Firm* — Allen, Dyer, Doppelt + Gilchrist, P.A.

(57) ABSTRACT

An air-to-ground communications system includes at least one base station to be positioned on the ground and including a ground-based transceiver, a phased array antenna coupled to the ground-based transceiver, and a beamforming network coupled to the ground-based transceiver. The ground-based transceiver is configured to provide data traffic and control information to an aircraft. The beamforming network is configured to simultaneously generate at least one narrow antenna beam for the data traffic and at least one wide beam for the control information.

32 Claims, 11 Drawing Sheets

(58) Field of Classification Search
USPC .... 455/63.4, 19, 436, 442, 562.1, 431, 12.1,
455/13.1, 13.2, 13.3, 25, 101, 434, 432.1,
455/435.2, 437, 440, 452.2, 525;
370/334, 336, 344, 345, 330, 328, 329,
370/332, 331, 338
See application file for complete search history.

(56) References Cited

U.S. PATENT DOCUMENTS

| | | |
|---|---|---|
| 8,676,192 B2 | 3/2014 | Jalali et al. |
| 2010/0202418 A1 | 8/2010 | Barrett |
| 2011/0286325 A1* | 11/2011 | Jalali ................. H04B 7/18506 370/221 |
| 2014/0004853 A1 | 1/2014 | Mitchell |
| 2015/0124688 A1* | 5/2015 | Xu ....................... H04B 7/0452 370/312 |

FOREIGN PATENT DOCUMENTS

| | | |
|---|---|---|
| WO | 2009/120462 | 10/2009 |
| WO | 2010/025997 | 3/2010 |
| WO | 2013095386 | 6/2013 |

OTHER PUBLICATIONS

Lufthansa Systems "Direct Air to Ground Data Connectivity for A/C Use of License Exempt Spectrum" Mar. 15, 2011; pp. 11. http://www.cept.org/documents/se-44/1492/infose44.

\* cited by examiner

TERRESTRIAL BASED AIR-TO-GROUND COMMUNICATIONS SYSTEM AND RELATED METHODS

RELATED APPLICATION

This application claims the benefit of U.S. Provisional Application Ser. No. 62/060,227 filed Oct. 6, 2014, the entire contents of which are incorporated herein by reference.

FIELD OF THE INVENTION

The present invention relates to the field of communications systems, and more particularly, to a terrestrial based air-to-ground (ATG) communications system.

BACKGROUND OF THE INVENTION

An ever increasing use of broadband services has led to an increase in data being carried over mobile networks. This is particularly so as users increasingly expect to be able to access high-speed Internet services on their own mobile devices wherever they travel.

Airline passengers would also like to be able to connect to the Internet when traveling. To meet this demand, a communications link needs to be established between the aircraft and ground while having sufficient capacity to allow for large numbers of passengers to simultaneously connect to the Internet.

Airlines currently providing Internet services to their passenger while in flight typically do so using the geostationary fixed satellite service (FSS). However, a drawback of using satellites is their limited bandwidth, cost of capacity and round-trip delays.

One approach for providing Internet services to airline passengers without the use of satellites is GoGo's air-to-ground communications system that uses ground-based broadband mobile cellular antenna towers that direct their signals at the sky rather than along the ground to provide aircraft connectivity. Similarly, AT&T was teaming up with Honeywell to provide an air-to-ground communications system. Honeywell proposes to build and deliver aircraft hardware needed to connect to AT&T's planned air-to-ground system in the U.S. With this service, passengers will experience global 4G LTE standards.

Yet another approach for providing Internet services to airline passengers without the use of satellites is disclosed in a technical report produced by ETSI Technical Committee Electromagnetic Compatibility and Radio Spectrum Matters (ERM), and referenced as ETSI TR 101 599 V1.1.1 (2012-07). This air-to-ground communications system operates in ISM bands and makes use of adaptive beamforming antennas operating around 2.4 GHz and/or 5.8 GHz. These ISM frequency bands are license exempt. Lufthansa Systems AG has proposed such a terrestrial based direct air-to-ground communications system.

Even in view of the above approaches for providing Internet services to airline passengers, there is still a need to improve on such an ATG communications system.

SUMMARY OF THE INVENTION

A terrestrial based air-to-ground (ATG) communications system provides broadband data services to aircraft. The ATG communications system includes at least one base station to be positioned on the ground and comprises a ground-based transceiver configured to provide data traffic and control information to an aircraft, a phased array antenna coupled to the ground-based transceiver, and a beamforming network coupled to the ground-based transceiver and configured to simultaneously generate at least one narrow antenna beam for the data traffic and at least one wide beam for the control information.

The ground-based transceiver may be configured to operate in an unlicensed frequency band. The unlicensed frequency band may be within a frequency range of at least one of 2.4 GHz to 2.5 GHz and 5.725 GHz and 5.875 GHz. The at least one wide antenna beam may cover a range of 20-70 degrees, and the at least one narrow antenna beam may cover a range of 5-15 degrees.

The control information may comprise allocation for downlink and uplink scheduling with the aircraft. In addition to or alternatively, the control information may also comprise system information messages. The data traffic may comprise email and text messaging services, video pictures, voice over IP (VoIP), for example.

The air-to-ground communications system may further comprise a controller coupled to the beamforming network and may be configured to be coupled to an Internet service provider (ISP). In addition to or alternatively, the air-to-ground communications system may also further comprise a controller coupled to the beamforming network and may be configured to be coupled to a public switched telephone network (PSTN).

The ground-based transceiver may comprise a direct-conversion transceiver. The beamforming network may be configured to digitally form the at least one narrow and wide antenna beams.

Another aspect is directed to a method for operating an air-to-ground communications system as described above. More particularly, the method comprises operating the beamforming network to simultaneously generate at least one narrow antenna beam for the data traffic and at least one wide beam for the control information.

Another feature of the ATG communications system is to control the sum of transmitted power per user from the ground-based phased array antenna. This feature may be advantageous when the communications system is operating in an unlicensed frequency band. The base station includes a controller that runs a power control algorithm. The power control algorithm takes into account the number of spatially overlapping and non-overlapping beams, as well as if the wide beam and the narrow beam are simultaneously transmitting.

Another feature of the ATG communications system is to provide an autonomous time advance from the aircraft to the base station for initial system acquisition. Instead of the base station determining the initial timing advance, the aircraft uses its location and speed (i.e., navigation information) and a known location of the base station to determine the initial timing advance autonomously. This advantageously extends the communications range over that of a standard compliant system.

Another feature of the ATG communications system is for the aircraft-based transceiver to provide a line of bearing (LoB) signal to the base station. The LoB signal tells the base station where the aircraft is located relative to the base station. The LoB signal advantageously allows the base station to steer the narrow beam toward the aircraft.

Another feature of the ATG communications system is to use online antenna calibration during a predetermined calibration interval. For example, the calibration signal may be transmitted in one OFDM symbol in a reserved subframe.

The calibration may be performed system wide during a specific calibration interval. The online antenna calibration is based on an inner-loop calibration and an outer-loop calibration. The inner-loop calibration is for calibrating phase active components and ambiguities of the antenna elements. The outer-loop calibration is for calibrating antenna amplifiers and cable length differences.

Another feature of the ATG communications system is to simultaneously transmit and receive (STAR) data and channel state information. Data may be transmitted from the base station on a first frequency, while channel state information may be transmitted from the aircraft simultaneously also on the first frequency. Data may be transmitted from the aircraft on a second frequency, while channel state information is transmitted from the base station simultaneously also on the second frequency.

Another feature of the ATG communications system is to use bearing-aided beamforming with a combined frequency, time and spatial domain multiplexing. A waveform agnostic beamforming module may be applied to existing OFDMA or SC-FDMA systems. This feature enhances existing radio technologies (i.e., LTE) to operate over longer ranges. Doppler enhancements may be provided based on velocities. High gain receive beamforming on the ground and in the air simultaneously allows reception from users in arbitrary directions.

Another feature of the ATG communications system is to use beamforming to simultaneously communicate, using the same frequencies, to aircraft and ground devices based on elevation domain spatial separation. This may be particularly beneficial when the aircraft is operating in the same unlicensed ISM band as the ground devices.

Another feature of the ATG communications system is to use multi-user Walsh spread OFDMA to provide interference mitigation with adjustable processing gain per user. This is applied transparently on top of standards compliant physical layer processing. This advantageously allows the system's standards compliant protocol layer to be reused without modification. In addition, the spread factor may be changed on an individual user basis to address interference for nearby devices.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
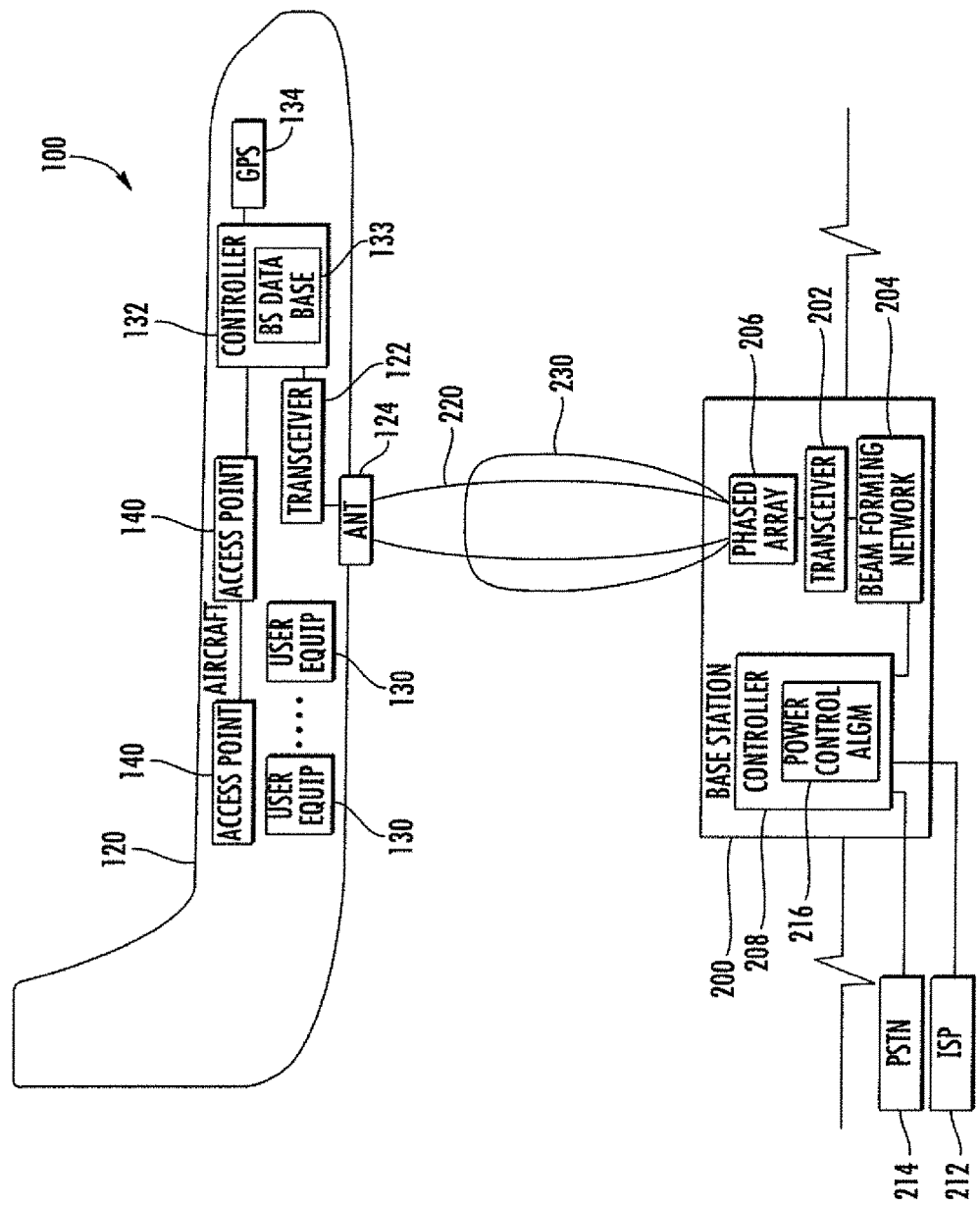
FIG. 1 is a block diagram of a terrestrial based air-to-ground (ATG) communications system in accordance with the present invention.

Referring initially to FIG. 1, a terrestrial based air-to-ground (ATG) communications system 100 provides broadband data services to aircraft 120. The ATG communications system 100 includes an aircraft-based transceiver 122 and associated antenna 124 configured to operate in an unlicensed frequency band, and at least one base station 200. The at least one base station 200 comprises a ground-based transceiver 202 configured to operate in the unlicensed frequency band for providing data traffic and control information to the aircraft-based transceiver 122. The base station 200 further includes a phased array antenna 206 and a beamforming network 204. The beamforming network 204 is configured to simultaneously generate at least one narrow antenna beam 220 for the data traffic and at least one wide beam 230 for the control information.

In the illustrated embodiment, the narrow and wide antenna beams 220, 230 are digitally formed by the beamforming network 204, and the ground-based transceiver 202 may be a direct-conversion transceiver which is also known as a zero-IF (ZIF) transceiver. Other types of transceivers may be used, as appreciated by those skilled in the art. Since the antenna beams are digitally formed, the ground-based transceiver 202 is between the beamforming network 204 and the phased array antenna 206.

In alternative embodiments, the narrow and wide antenna beams 220, 230 may be formed using an analog based beamforming network. This would require the beamforming network to be positioned between the ground-based transceiver 202 and the phased array antenna 206.

As will be discussed in greater detail below, each base station 200 operates over multiple channels. In digital beamforming, each channel is typically coupled to a column of array elements in the phased array antenna 206. Consequently, there are multiple ground-based transceivers 202, with each transceiver supporting one or more channels.

Even though only one base station 200 is illustrated, in a typical system, a plurality of base stations are spread out over a large scale area so as to maintain connectivity with the aircraft 120 as the aircraft travels across the area. Each base station 200 includes a controller 208 coupled to the beam-forming network 204. The controller 208 may include one or more processors and associated memories. The controller 208 also interfaces with an Internet service provider (ISP) 212 for providing Internet connectivity as well as email and text messaging services, and with a public switched telephone network (PSTN) 214. In addition, video pictures and voice over IP (VoIP) may also be provided over the Internet connectivity. Alternatively, an Internet connection could only be provided and not a PSTN connection.

Passengers within the aircraft 120 are able to receive broadband data services from the base station 200 using their own user equipment (UE) 130. User equipment 130 includes personal mobile smart phones or telephones (cellular and PCS), personal digital assistants, wireless email devices, wireless equipped laptop computers having Wi-Fi/WiMax capability, air cards, or WiFi equipped MP3 players, for example.

In the illustrated embodiment, equipment has been installed on the aircraft 120 so that the aircraft appears as a hotspot or intranet to the user equipment 130. Nodes or access points 140 are spaced throughout the cabin area of the aircraft 120 providing 802.11 services (i.e., Wi-Fi) or 802.16 services (i.e., WiMax), for example.

The unlicensed frequency band may fall within the ISM band, for example, which is a portion of the radio spectrum reserved internationally for industrial, scientific and medical (ISM) purposes other than telecommunications. Example unlicensed frequency bands include 2.4 GHz to 2.5 GHz and 5.725 GHz and 5.875 GHz. Within each of these respective frequency bands, the ground-based transceiver 202 and the aircraft-based transceiver 122 may be configured to operate at 2.4 GHz and 5.8 GHz, for example.

The RF emissions from devices operating within the ISM bands can create electromagnetic interference. This electromagnetic interference may disrupt other devices operating at the same frequency. As a result, these devices have typically been limited to certain bands of frequencies. In general, communications systems operating in these bands need to tolerate any interference generated by ISM equipment, and users have no regulatory protection from ISM device operation.

In recent years, the fastest-growing uses of the ISM bands have been for short-range, low power communications systems. Cordless phones, Bluetooth phones, Bluetooth devices, near field communication (NFC) devices, and wireless computer networks all use frequencies allocated to low power communications within license exempted frequencies within the ISM band.

The air-to-ground communications system 100 operating within unlicensed ISM bands presents many challenges. For example, the FCC requires low transmit power in the ISM bands. WiFi interferences from wireless computer networks operating over a large scale area produce a raised noise floor with random strong interferers. Limited spectrum and high data rate demands may require spatial multiplexing for multiple simultaneous users. Operations from a ground-based deployment to aircraft may desirably use limited base stations due to cost.

Figure 2:
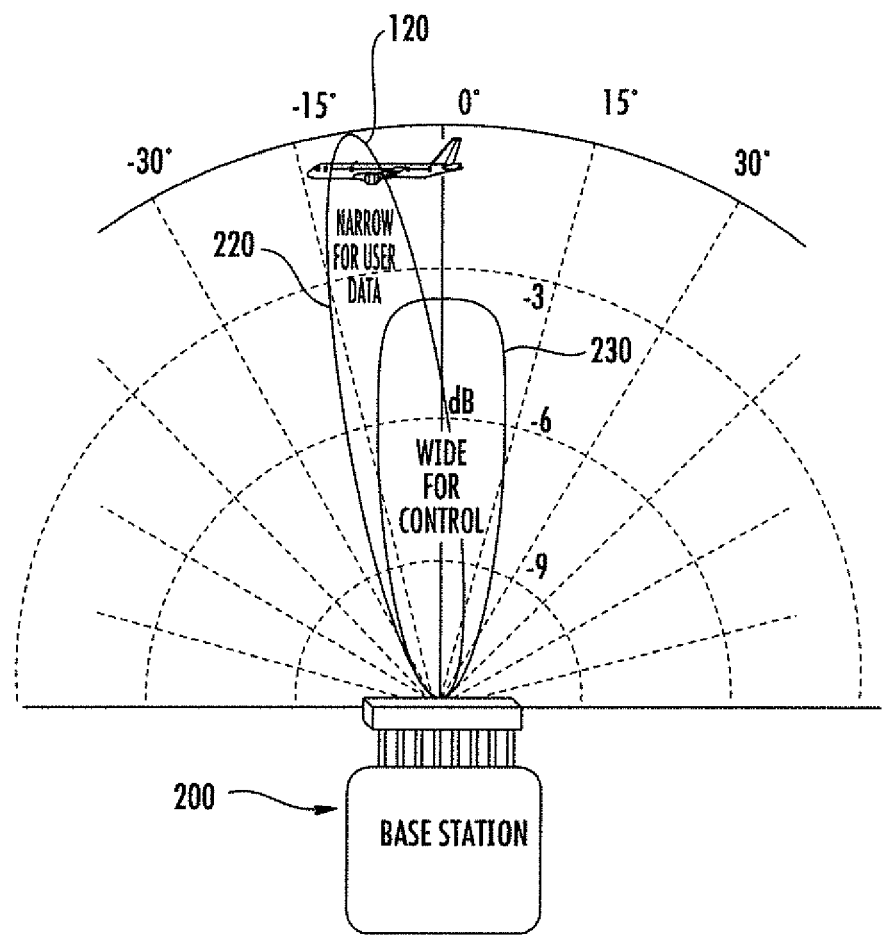
FIG. 2 is a block diagram of the base station illustrated in FIG. 1 generating a wide beam and a narrow beam for the aircraft.

For illustration purposes, the wide beam 230 may cover within a range of 20 to 70 degrees and the narrow beam 220 may cover within a range of 5 to 15 degrees. More particularly, the wide beam 230 may be at 30 degrees and the narrow beam 220 may be at 8 degrees, for example, as illustrated in FIG. 2. The 30° and the 8° are measured at each antenna beam's 3 db points. Depending on the intended application, each of the narrow and wide beams 220, 230 may be formed with more or less degrees of coverage, as readily appreciated by those skilled in the art.

The wide beam 230 has less antenna gain and a lower data rate as compared to the narrow beam 220. The control information includes allocation for downlink and uplink scheduling, as well as system information messages, for example. The uplink is from the aircraft 120 to the base station 200, and the downlink from the base station 200 to the aircraft 120. The uplink is known as the reverse link, and the downlink is known as the forward link.

As noted above, the data provided by the wide beam 230 and the control information provided by the narrow beam 220 may be simultaneously generated by the base station 200. Alternatively, the wide beam 230 and the narrow beam 220 may be time interleaved.

In addition, the ATG communications system 100 may be configured to operate in licensed frequency bands. Licensed frequency bands, for example, may cover a portion of the radio spectrum currently used for terrestrial wireless communications companies, including 824-849 MHz, 869-894 MHz, and 1.9 GHz. Other licensed frequencies may be used by the ATG communications system 100, as readily appreciated by those skilled in the art.

Reference is directed to U.S. Pat. No. 8,676,192 for a high data rate ATG communication antenna system, which is incorporated herein by reference.

Another feature of the ATG communications system 100 is to control the sum of transmitted power per remote node from the ground-based phased array antenna 206. This feature is particularly needed when the communications system 100 is operating in an unlicensed frequency band.

Figure 3:
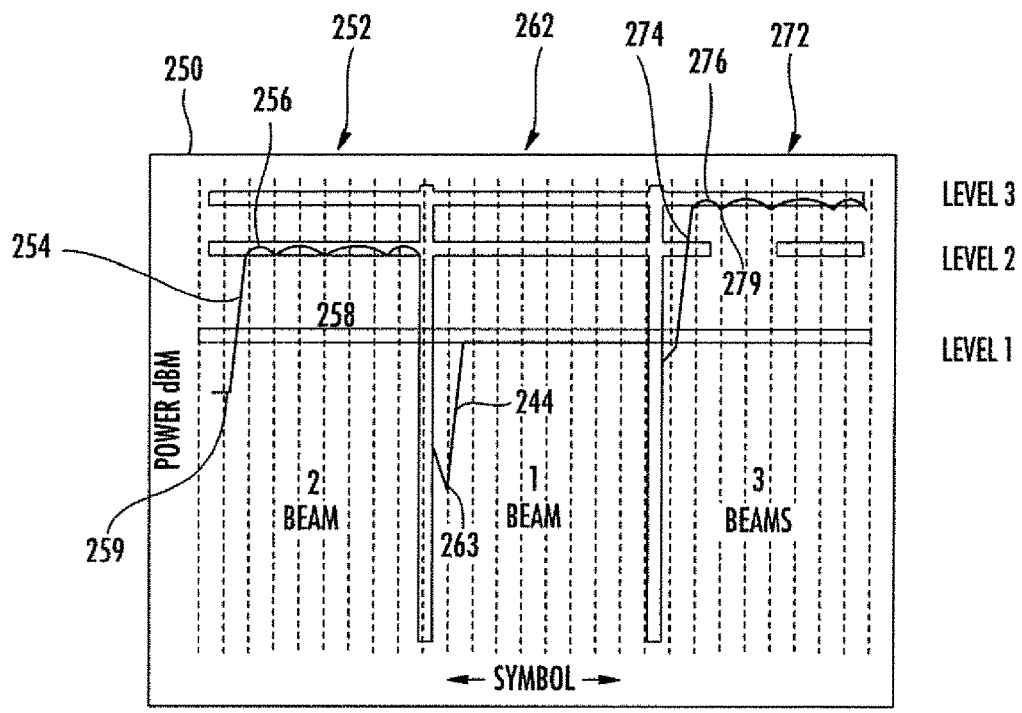
FIG. 3 is a graph of the antenna power levels at the base station illustrated in FIG. 1 based on the number of non-overlapping antenna beams being generated.

Referring now to FIG. 3, the illustrated chart 250 shows the transmit powers level for the ATG communications system 100 based on the number of non-overlapping beams. Section 252 is for 2 non-overlapping beams, section 262 is for a single beam, and section 272 is for 3 non-overlapping beams. Beams are non-overlapping if they do not overlap at their 3 db points.

The transmit power is adjusted for each beam to reach a maximum allowed level, but the power density of what is transmitted scales based on user bandwidth. Bandwidths may vary between 540 kHz to 20 MHz, for example. If the entire bandwidth is assigned, then the power density would be lower so as to hit the target total power. The wide beam 230 has a fixed power density per sub carrier, but the narrow band 230 has an adjustable power density.

As illustrated in FIG. 1, the base station 200 includes a controller 208 that runs a power control algorithm 216. The power control algorithm 216 takes into account the number of spatially overlapping and non-overlapping beams, as well as if the wide beam 230 and the narrow beam 220 are simultaneously generated.

The transmit power varies between a single beam and multiple non-overlapping beams. Moreover, the power level varies depending on how many beams are being simultaneously generated. Chart 250 (FIG. 3) is for illustration purposes, and the power levels (generically marked as Levels 1, 2 and 3) will vary based on different applications.

In section 252 of the chart 250, the antenna power graph 254 has a power level of Level 2 for two non-overlapping beams. The upper levels 256 of the antenna power graph 254 correspond to only generating data traffic for the narrow beam 220. The power level is slightly reduced when simultaneously generating data traffic for the narrow beam 220 and generating control information for the wide beam 230, as indicated by the dips 258 in the antenna power graph 254. Reference 259 of the antenna power graph 254 corresponds to generating only control information with the wide beam 230.

In section 262 of the chart 250, the antenna power graph 244 has a power level of Level 1 for a single beam. Reference 244 of the antenna power graph 254 corresponds to generating only control information with the wide beam 230.

In section 272 of the chart 250, the antenna power graph 274 has a power level of Level 3 for three non-overlapping beams. Similar to section 252, the upper levels 276 of the antenna power graph 254 correspond to only generating data traffic for the narrow beam 220. The power level is slightly reduced when simultaneously generating data traffic for the narrow beam 220 and generating control information for the wide beam 230, as indicated by the dips 258 in the antenna power graph 274. Reference 279 of the antenna power graph 254 corresponds to generating only control information with the wide beam 230.

For two overlapping beams, such as for two different aircraft, the power level for one beam will be applied, as illustrated in section 262 of the chart 250. Reference is directed to WO/2010/025997, which is incorporated herein by reference.

Another feature of the ATG communications system 100 is to provide an autonomous time advance from the aircraft 120 to the base station 200 for initial system acquisition. The aircraft-based transceiver 122 initially receives occasional synchronization signals from the base station 200. Since location of the base station 200 is known, the aircraft-based transceiver 122 calculates its own timing advance autonomously and transmits an access signal with an autonomous timing advance to the base station 200.

The autonomous timing advance is determined through an estimate of the propagation delay between the aircraft 120 and the base station 200. In the aircraft, a controller 132 is coupled to the aircraft-based transceiver 122. The controller 132 includes a database 133 of the locations of the base stations 200. An aircraft positioning determining device 134, such as a GPS device, is coupled to the controller 132 for determining location of the aircraft 120.

Figure 4:
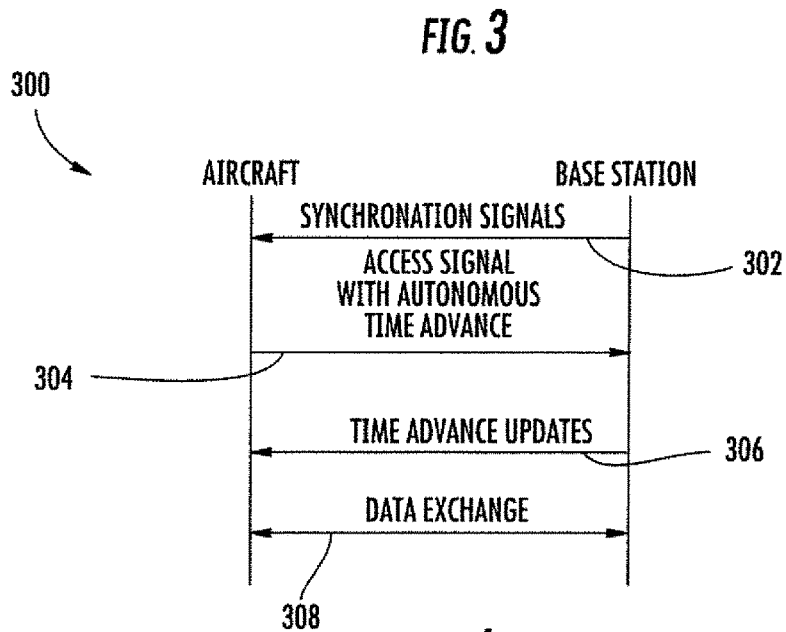
FIG. 4 is an event flow diagram providing a sequence of events for establishing communications between the base station and the aircraft illustrated in FIG. 1 using an autonomous timing advance generated by the aircraft.

Reference is directed to the event flow diagram 300 in FIG. 4 which provides a sequence of events for establishing communications between the base station 200 and the aircraft 120. Starting with event 302, the base station 200 uses a wide beam 230 to transmit control information to the aircraft 120. The control information may also be referred to as reference signals.

Event 304 is the aircraft 120 determining the autonomous timing advance based on an estimate of the propagation delay between the aircraft 120 and the base station 200. The aircraft 120 generates an access signal with the autonomous timing advance. Instead of the base station 200 determining the initial timing advance, the aircraft 120 uses its location and speed (i.e., navigation information) and a known location of the base station 200 to determine the initial timing advance autonomously. This advantageously helps to extend the communications range up to 3 times over that of a standard compliant system.

Event 306 corresponds to subsequent time advance updates provided by the base station 200 to the aircraft 120. Event 308 corresponds to the exchange of data between the base station 200 and the aircraft 120. The base station 200 uses the wide beam 230 for events 302 and 306, and switches to the narrow beam 220 for event 308.

Reference is directed to European Patent No. 2408243 and W.O. 2009120462, which are incorporated herein by reference.

Another feature of the ATG communications system 100 is for the aircraft-based transceiver 122 to provide a line of bearing (LoB) signal to the base station 200 so that the base station can use position-aided beamforming when communicating with the aircraft 120. The LoB signal advantageously allows the base station 200 to steer the narrow beam 220 to the aircraft 120.

In view of the above discussions on the aircraft-based transceiver 122 calculating its own timing advance autonomously, the LoB signal is generated after time advance updates have been provided by the base station (i.e., event 306) to the aircraft 120. In other embodiments, the LoB signal may be generated even if the aircraft did not autonomously determine its timing advance to the base station 200.

Figure 5:
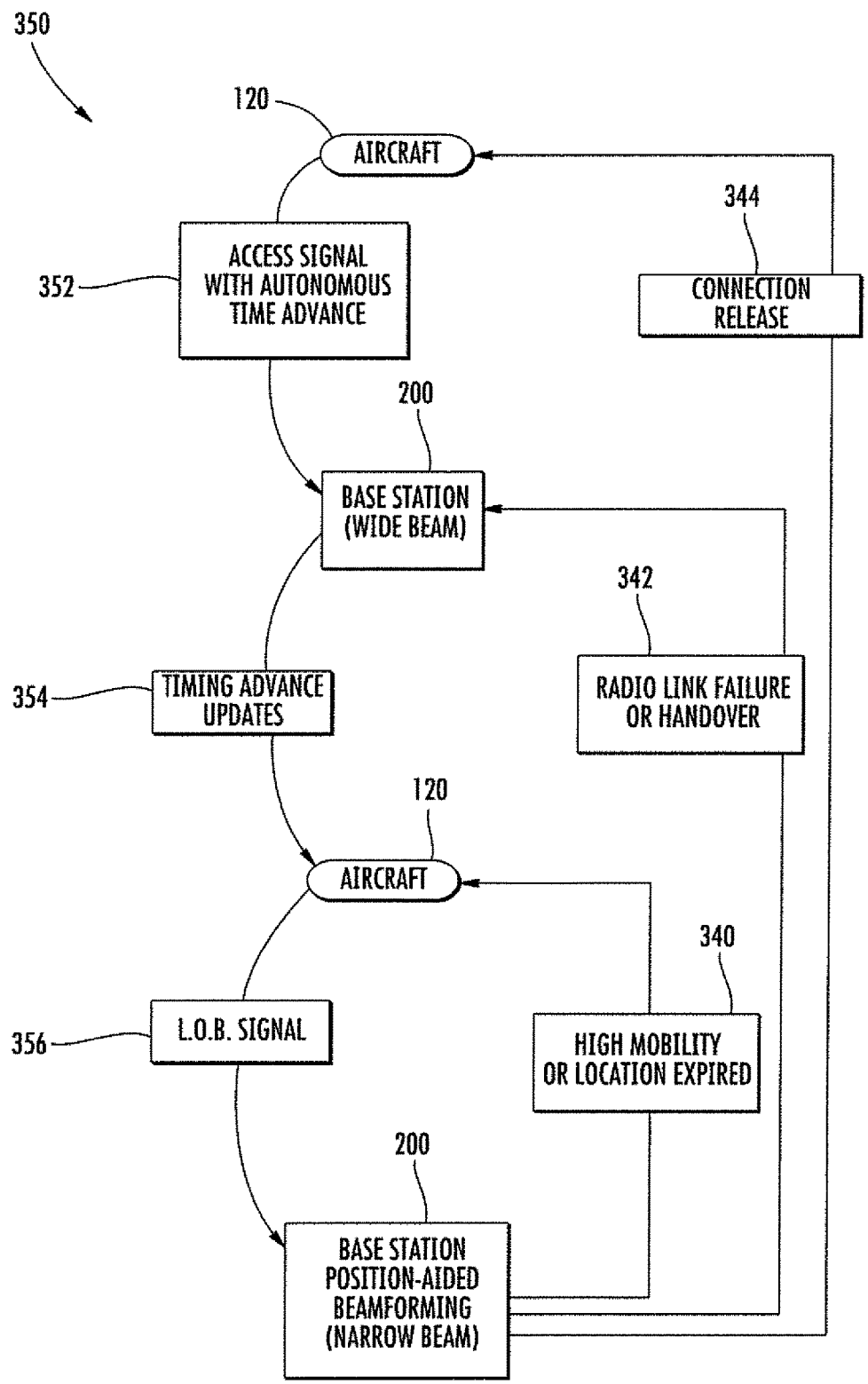
FIG. 5 is an event flow diagram providing a sequence of events for establishing communications between the base station and the aircraft illustrated in FIG. 1 using a line of bearing (LoB) signal provided from the aircraft to the base station for position-aided beamforming by the base station.

Reference is directed to the event flow diagram 350 in FIG. 5 which provides a sequence of events for the base station 200 to use position-aided beamforming. The aircraft 120 transmits an access signal with an autonomous time advance at Block 352 to the base station 200. The base station is in a non-beamforming mode and uses its wide beam 230 to transmit timing advance updates at Block 354 to the aircraft 120. The aircraft 120 transmits a LoB signal at Block 356 to the base station 200.

The LoB signal tells the base station 200 where the aircraft 120 is located relative to the base station. As noted above and as illustrated in FIG. 1, the controller 132 includes a database 133 of the locations of the base stations 200, and a GPS device 134 is coupled to the controller for determining location of the aircraft 120. For example, the LoB signal may report to the base station 200 that the aircraft 120 is 300 degrees relative to the base station. The LoB signal advantageously allows the base station 200 to steer the narrow beam 220 toward the aircraft 120. The position-aided beamforming by the base station 200 is applicable on both transmit and receive.

Certain events will require a new or updated LOB signal. For example, event 340 is for high mobility between the aircraft 120 and the base station 200, and if the aircraft location associated to the LOB signal has expired. For this event, a new LoB signal is transmitted by the aircraft. A radio link failure or handover is event 342. For this event, the base station 200 generates new timing advance updates for the aircraft 120 so that the aircraft can then generate new LoB signal. A connection release is event 344. For this event, the process starts at the beginning.

Another feature of the ATG communications system 100 is to use online antenna calibration during a predetermined calibration interval. The calibration signal may be transmitted in one orthogonal frequency-division multiplexing (OFDM) symbol in a reserved subframe.

OFDM is also termed multicarrier modulation (MCM) because the signal uses multiple carrier signals that are transmitted at different frequencies. Digital data is encoded on multiple carrier frequencies in OFDM. A large number of closely spaced orthogonal sub-carrier signals are used to carry data on several parallel data streams or channels. Each sub-carrier is modulated with a conventional modulation scheme (such as quadrature amplitude modulation or phase-shift keying) at a low symbol rate, maintaining total data rates similar to conventional single-carrier modulation schemes in the same bandwidth.

Figure 6:
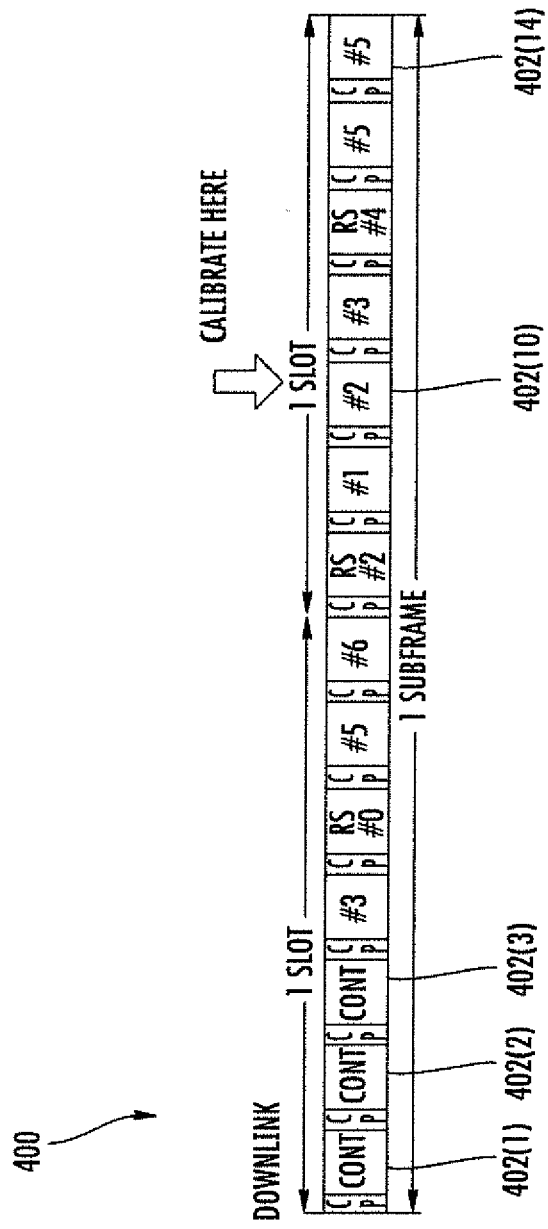
FIG. 6 is a schematic representation of OFDM symbols within a subframe, with one of the symbols being used for online antenna calibration in accordance with the present invention.

For illustrations purposes, a subframe 400 includes multiple OFDM symbols 402(1)-402(14), as illustrated in FIG. 6. A respective cyclic prefix (CP) is before each symbol to serve as a guard interval. The symbols that are shaded are not being used so the calibration symbol could be transmitted in anyone of these symbols. For illustration purposes, symbol 402(10) is used to transmit the calibration symbol.

As will be explained in greater detail below, no downlink or uplink transmissions are needed during the online antenna calibration. Instead, transmission of the calibration symbol is internal or self-contained within the base station, and within the aircraft. Antenna calibration is done nation-wide during a specific calibration interval. Control signals are still transmitted but not simultaneous with the calibration signal.

The base station 200 includes a separate calibration transceiver and the phased-array antenna 206 includes an extra element for antenna calibration. The self-contained antenna calibration advantageously allows the ATG communications system 100 to transmit and receive at the same time on different frequencies.

In a standard LTE system, beamforming is done in a time division duplex (TDD) fashion. In a TDD system, the same frequency is used for uplink and downlink but at different time slots. Since the same frequency is being used for uplink and downlink, antenna calibration is based on a channel estimate provided by a device to the base station. The device communicating with the base station may be a cell phone, modem, or other type of device that is capable of communicating with the base station over a wireless channel. Here, the base station receives a packet from the device. The base station knows where the packet came from, and also knows the weights and phases on each of the antenna elements for that particular device. The base retransmits to the same device using the same channel estimates.

Beamforming for the ATG communications system 100 is done in a frequency division duplex (FDD) fashion. In an FDD system, different frequencies are used for uplink and downlink but at the same time slots. Since different frequencies are used, the channel estimates and calibration values are different between the two frequencies.

The calibration signal may be based on a low-PAPR preamble or a Zadoff-Chu sequence. Generation of the low-PAPR preamble is disclosed in U.S. Pat. No. 8,160,166, which is incorporated herein by reference in its entirety. The Zadoff-Chu sequence is built into LTE systems since it is used for synchronization and demodulation references. Reference is also directed to U.S. Published Patent Application No. 2010/0202418, which is incorporated herein by reference.

Calibration of the ATG communications system 100 is based on a two-step process. The two-step process includes an inner-loop calibration and an outer-loop calibration. The inner-loop calibration is for the transceiver phase ambiguities and active components. The outer-loop calibration is for antenna amplifiers and cable length differences. The inner-loop and outer-loop calibrations are performed for both transmit and receive paths.

Initially, each antenna 206 is calibrated in a chamber. In the chamber, the amplitude and phase differences are calculated between antenna elements across the frequency, and the cables and RF circuitry going through the channels are all calibrated. Once operational in the field, the inner-loop calibration is periodically performed, such as once every ten seconds. This is needed to track changes in the active components over time. The outer-loop does not need to be performed as often since the cables and antenna elements are more stable over time.

Figure 7:
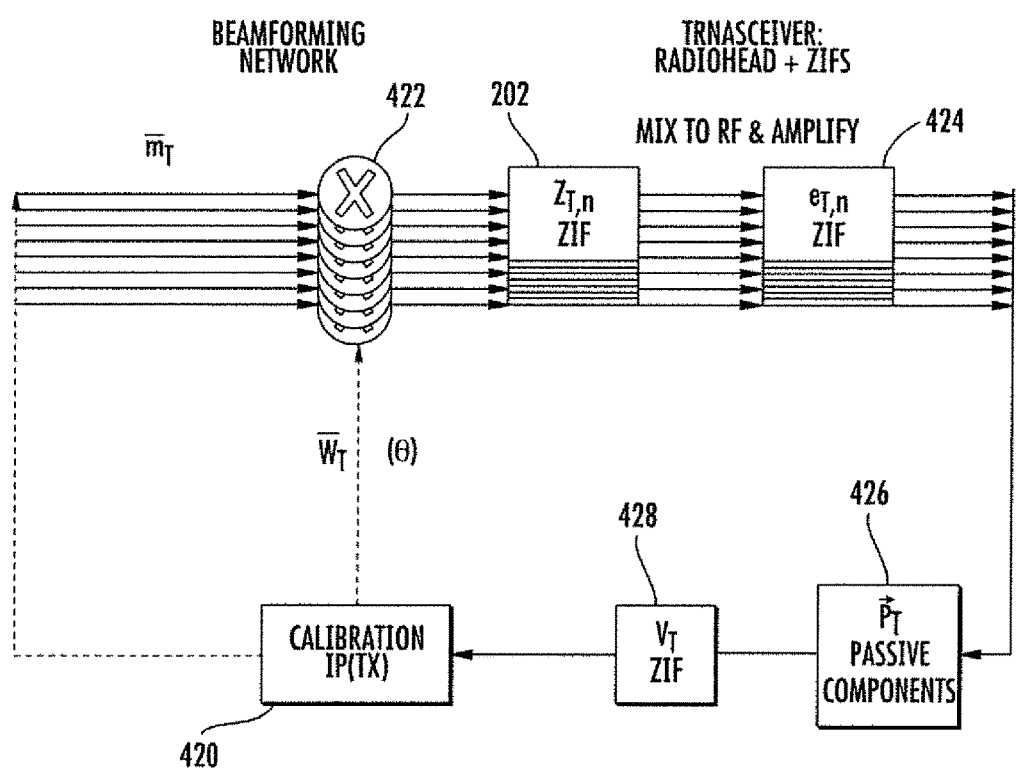
FIG. 7 is a block diagram of the base station showing an inner-loop calibration for the transmitters in accordance with the present invention.

Referring now to FIG. 7, the inner-loop calibration for the transmit paths involves a calibration signal being sent from the calibration IP circuitry 420 to each of the transceivers 202. The illustrated base station 200 is configured as an eight channel system, for example. Each channel receives the same calibration signal from a respective multiplier 422. The calibration signal is transmitted through each of the transceivers 202 and the active components 424 within each respective channel.

The outputs from the eight channels are summed at the passive components 426 before being received by a calibration transceiver 428. The calibration transceiver 428 provides the received summed signal to the calibration IP circuitry 420. The calibration IP circuitry 420 adjusts the weights at the multipliers so as to compensate for transmit component variances.

Figure 8:
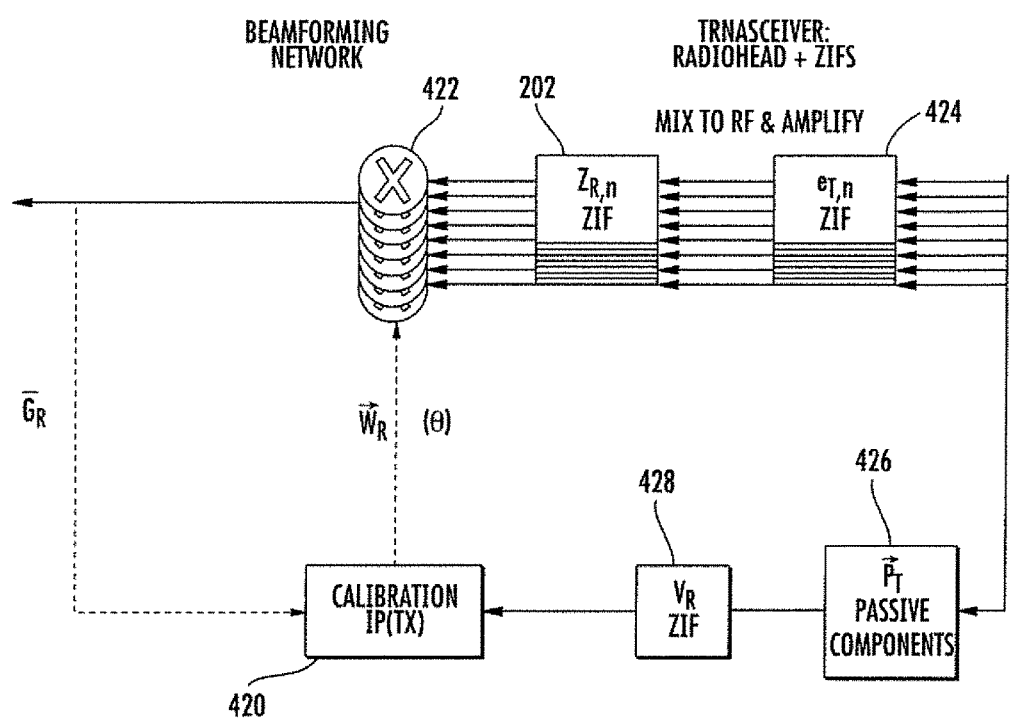
FIG. 8 is a block diagram of the base station showing an inner-loop calibration for the receivers in accordance with the present invention.

Referring now to FIG. 8, the inner-loop calibration for the receive paths involves a calibration signal being sent from the calibration IP circuitry 420 to the calibration transceiver 428. The calibration signal is transmitted through the passive components 426. The output from the passive components 426 is provided to each of the active components 424 and the transceivers 202. The outputs from the transceivers 202 are provided to their respective multipliers 422.

The output from each multiplier 422 is provided to the calibration IP circuitry 420. The calibration IP circuitry 420 adjusts the weights at the multiplier so as to compensate for receive component variances.

Figure 9:
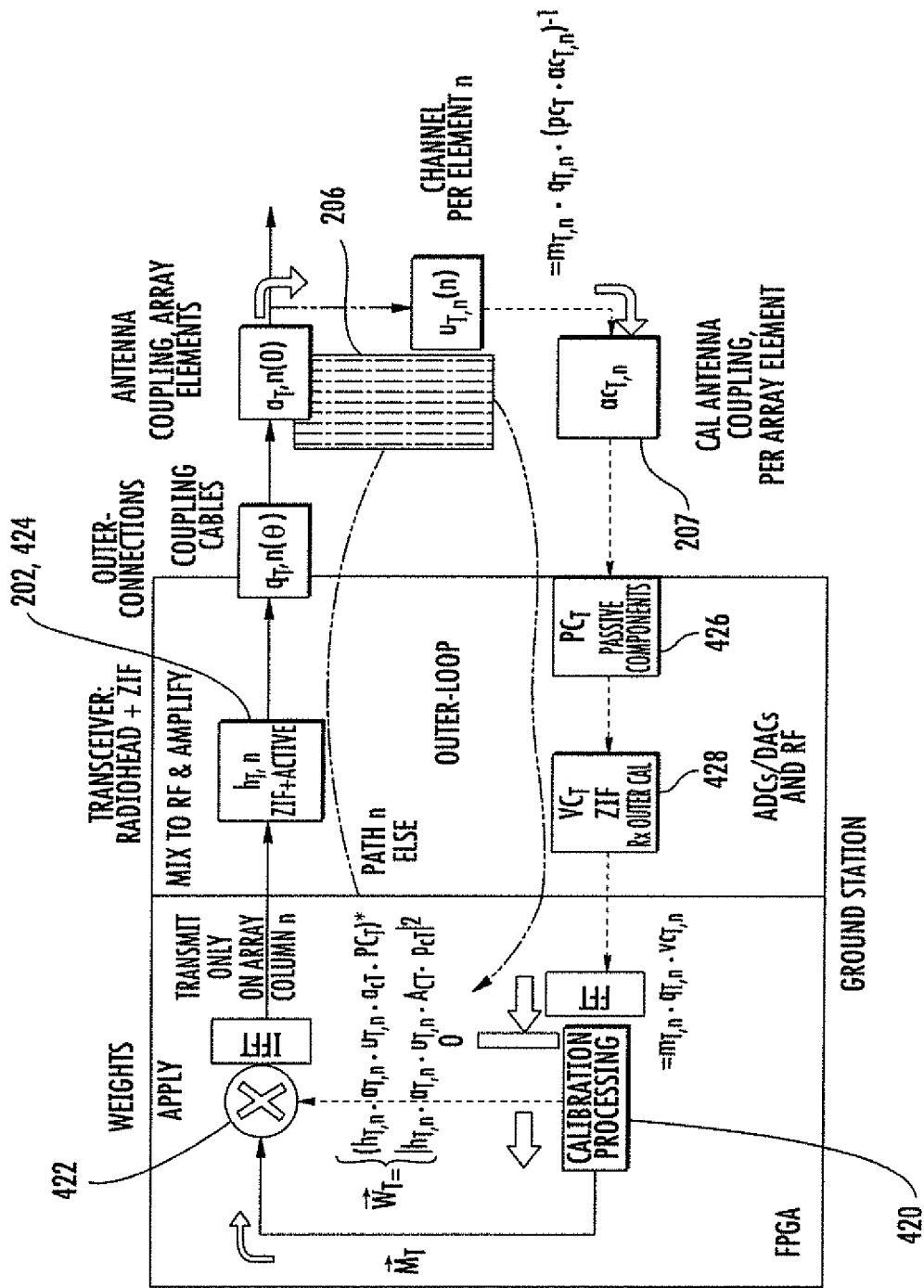
FIG. 9 is a block diagram of the base station showing an outer-loop calibration in accordance with the present invention.

Referring now to FIG. 9, the outer-loop calibration involves the use of an extra element 207 at the phased array 206. The outer-loop calibration is performed separately for each transmit channel and for each receive channel. Even though the calibration signal is transmitted within one OFDM symbol, this transmission is repeated eight times, once for each channel. The calibration IP circuitry 420 adjusts the weights at the multiplier so as to compensate for component variances for transmit and receive.

In addition, the ATG communications system 100 may be configured to operate with an alternate outer-loop calibration path consisting of RF couplers near the transmit or receive antenna elements.

Figure 10:
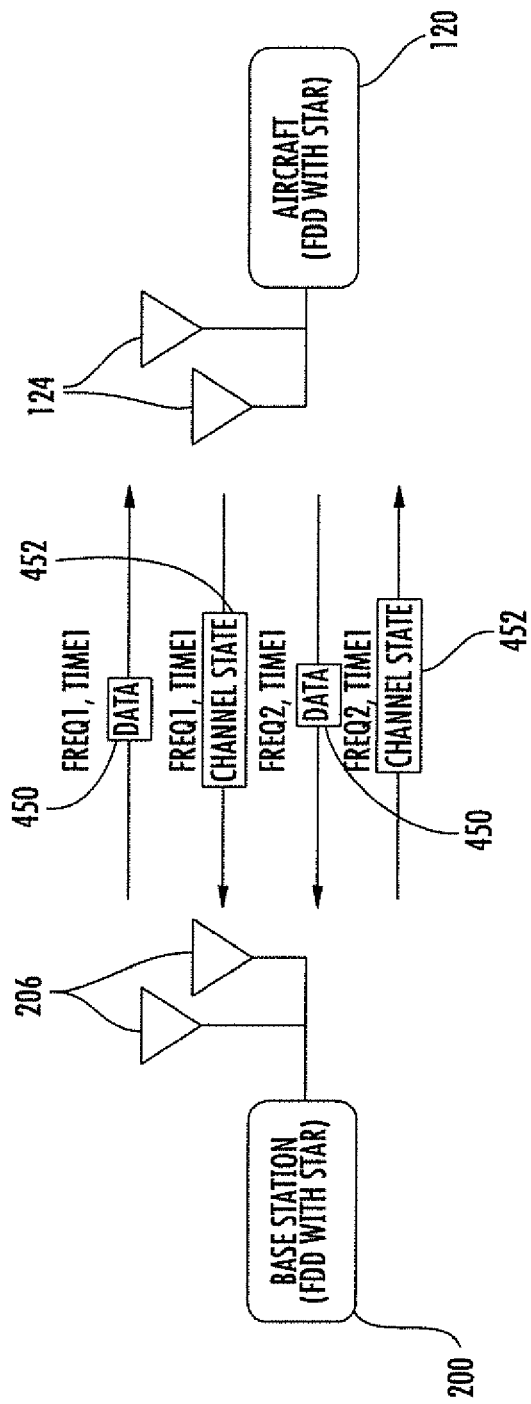
FIG. 10 is a simplified block diagram of the ATG communications system illustrated in FIG. 1 operating using simultaneous transmit and receive (STAR) of data and channel state information.

Another feature of the ATG communications system 100 is for the system to operate using simultaneous transmit and receive (STAR) of data and channel state information, as illustrated in FIG. 10. Data 450 is transmitted from the base station 200 on a first frequency, while channel state information 452 is transmitted from the aircraft 120 also on the first frequency. Data 450 is transmitted from the aircraft 120 on a second frequency, while channel state information 452 is transmitted from the base station 200 also on the second frequency.

For the ATG communications system 100 operating in the unlicensed ISM frequency band, the aircraft 120 transmits to the base station 200 on a lower ISM band and receives from the base station on an upper ISM band. Similarly, the base station 200 transmits to the aircraft 120 on the upper ISM band and receives from the aircraft on the lower ISM band. The same concept of simultaneously transmitting and receiving also applies to the ATG communications system 100 operating in licensed frequency bands, as readily appreciated by those skilled in the art.

Simultaneously transmitting and receiving advantageously has low latency characteristics. Low latency is very helpful when doing video conferencing, for example. Low latency is also very helpful when remote piloting an unmanned aerial vehicle.

Low latency channel state information from the receiver to the transmitter allows for enhanced transmit beamforming in a fast-fading frequency selective channel (e.g., high speed aircraft in multipath). Low latency also facilities accurate calibration for both the transmitter and receiver and combines multipath for additional SNR improvement.

In addition, the aircraft may be configured to periodically transmit a reference signal at the ground station transmit frequency during special calibration time slots. The ground station receives the transmission and estimates the channel state for transmissions to the aircraft. Likewise, the ground station may be configured to periodically transmit a reference signal at the aircraft transmit frequency during special calibration time slots. The aircraft receives the transmission and estimates the channel state for transmissions to the aircraft. Transmitting on the devices' normal receive frequency advantageously allows beamforming using directly measured channel estimates as done with TDD systems.

Reference is directed to W.O. 2013095386, which is incorporated herein by reference.

Another feature of the ATG communications system is to use bearing-aided beamforming with a combined frequency, time and spatial domain multiplexing. A waveform agnostic beamforming module may be applied to existing OFDMA or SC-FDMA systems. This feature enhances existing radio technologies (i.e., LTE) to operate over longer ranges. Doppler enhancements may be provided based on velocities. High gain receive beamforming on the ground and in the air simultaneously allows reception from users in arbitrary directions.

Figure 11:
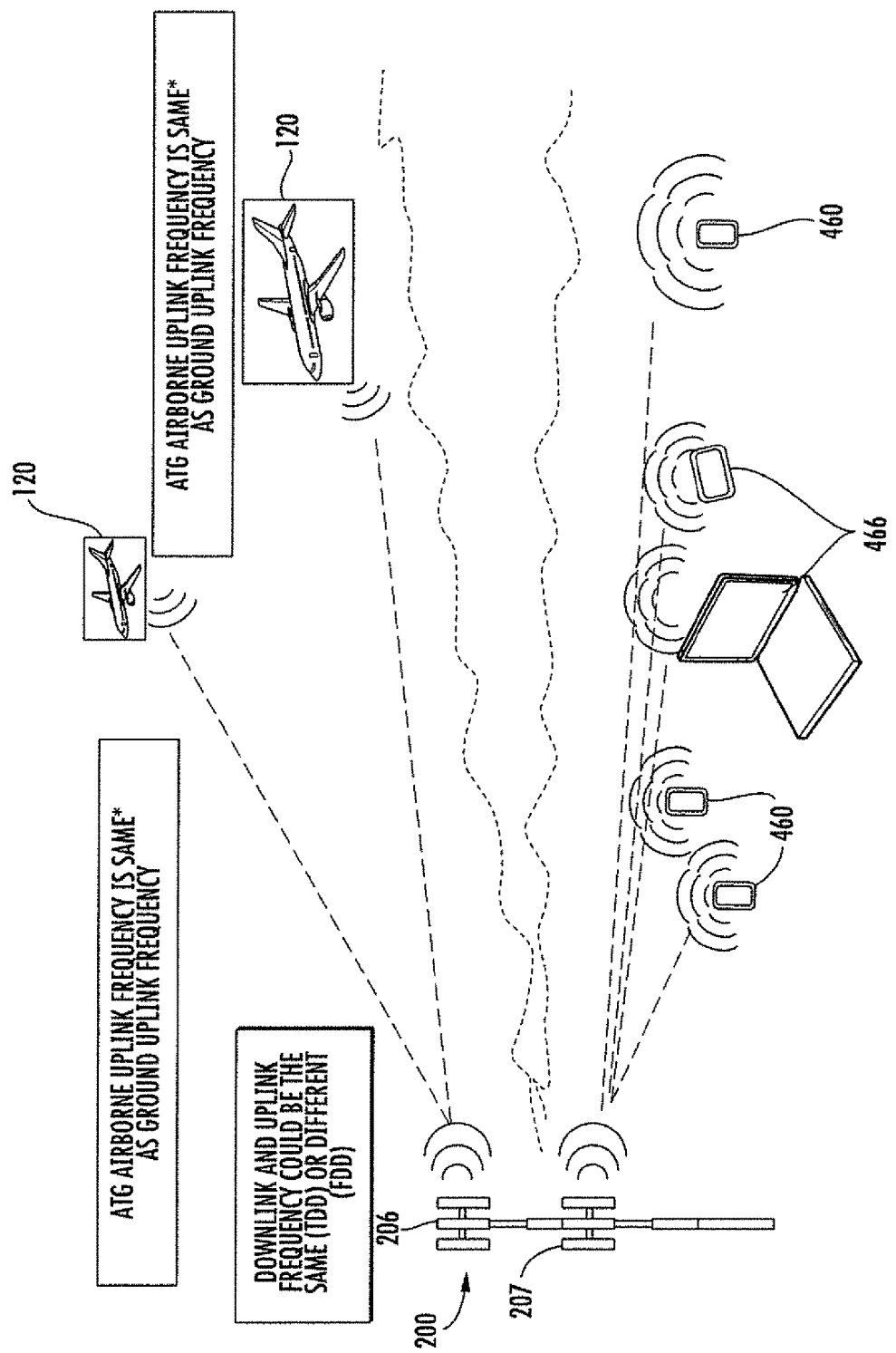
FIG. 11 is a simplified block diagram of the ATG communications system illustrated in FIG. 1 using beamforming to simultaneously communicate, using the same frequencies, to aircraft and ground devices based on elevation domain spatial separation.

Another feature of the ATG communications system 100 is to use beamforming to simultaneously communicate, using the same frequencies, to aircraft 120 and ground devices 460 based on elevation domain spatial separation, as illustrated in FIG. 11. This is particularly beneficial when the aircraft is operating in the same unlicensed ISM band as the ground devices 460.

The phased array antenna 206 at the base station 200 has a very narrow vertical beam while allowing for suppressed side lobes. The very narrow vertical beam allows the phased array antenna 206 to have a high gain for the aircraft 120. This allows the side lobes to have a low gain so as to avoid interference with the ground devices 460.

The aircraft downlink frequency from the base station 200 to the aircraft 120 is the same as the ground downlink frequency from the base station to the ground devices 460. The aircraft uplink frequency from the aircraft 120 to the base station 200 is the same as the ground uplink frequency from the ground devices 460 to the base station.

A different antenna 207 at the base station 200 supports the ground devices 460. In other embodiments, the uplink frequency from the aircraft 120 may be different from the uplink frequency of the ground devices 460. Reference is directed to U.S. Published Patent Application No. 2014/0004853, which is incorporated herein by reference.

Another feature of the ATG communications system is to use multi-user Walsh spread OFDMA to provide interference mitigation with adjustable processing gain per user. This may be applied transparently on top of standards compliant physical layer processing. This may advantageously allow the systems standards compliant protocol layer to be reused without modification.

Figure 12:
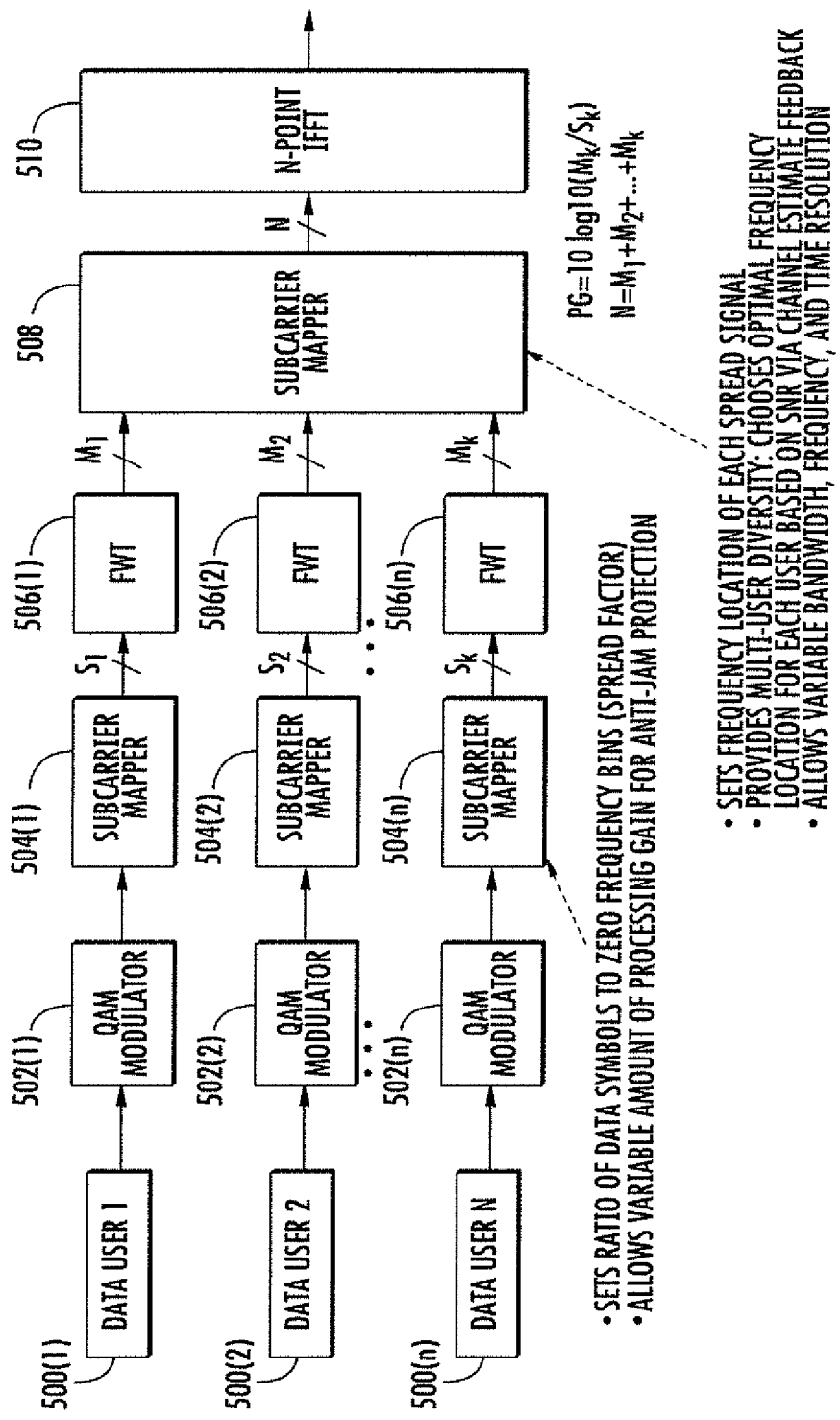
FIG. 12 is a block diagram of a multi-user Walsh spread OFDMA system in accordance with the present invention.

A block diagram illustrating a multi-user Walsh spread OFDMA system is provided in FIG. 12. All of the users 500(1)-500(n) use the same waveform. For the multi-user case, pilot subtones are used with different subcarriers for each of the users. The data from each user 500(1)-500(n) is provided to respective QAM modulators 502(1)-502(n). The subcarrier mappers 500(1)-500(n) map each user to specific sets of subcarriers. The subcarrier mappers 500(1)-500(n) set the ratio of data symbols to zero frequency bins (i.e., the spread factor). This allows a variable amount of processing gain for anti-jam protection.

The output of the subcarrier mappers 500(1)-500(n) is provided to fast Walsh transform (FWT) devices 506(1)-506(n). After the Walsh transforms, all of the users 500(1)-500(n) are mapped at the subcarrier mapper 508. The subcarrier mapper 508 sets the frequency location of each spread signal. This provides multi-user diversity by choosing an optimal frequency location for each user band based on SNR via channel estimate feedback. This also allows for a variable bandwidth, frequency and time resolution.

An N-point IFFT device 510 receives the output from the subcarrier mapper 508. The resulting inverse fast Fourier transform looks like one OFDM waveform for one user. In reality, the OFDM waveform is made up of many users. This advantageously allows the spread factor to be changed on an individual user basis. If a particular user was being jammed by other users, then the spread factor for that user could be increased at the corresponding FWT device.

In addition to optimally allowing variable anti-jam protection per user, the multi-user Walsh spread OFDMA system eliminates wasted bandwidth (i.e., spreading overhead). Performance of the OFDM waveform is improved by protecting the data and pilot subcarriers. Moreover, the data rate is increased over multipath channels by providing multiuser diversity by selecting optimal SNR frequency bins per user to mitigate frequency selective fading. Reference is directed to U.S. Pat. No. 7,813,433 and to International Published patent application No. 2010/025997, which are incorporated herein by reference.

Components and features of the various embodiments disclosed herein can be combined as will be appreciated by those skilled in the art. Additional features, advantages, and components of the various embodiments are further described in the accompanying pages. As an alternative to OFDM, as discussed above, other protocols may be used with the ATG communications system 100.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed:

1. An air-to-ground communications system comprising:
   at least one base station to be positioned on the ground and comprising
      a ground-based transceiver configured to provide data traffic and control information to an aircraft,
      a phased array antenna coupled to said ground-based transceiver,
      a beamforming network coupled to said ground-based transceiver and configured to simultaneously generate at least one narrow antenna beam for the data traffic and at least one wide antenna beam for the control information, the at least one wide antenna beam having a lower antenna gain and a lower data rate as compared to the at least one narrow antenna beam, and
      a controller coupled to said beamforming network and configured to control a sum of simultaneously transmitted power of the at least one antenna narrow beam for data traffic and the at least one wide antenna beam for the control information.

2. The air-to-ground communications system according to claim 1 wherein said ground-based transceiver is configured to operate in an unlicensed frequency band.

3. The air-to-ground communications system according to claim 2 wherein the unlicensed frequency band is within a frequency range of at least one of 2.4 GHz to 2.5 GHz and 5.725 GHz and 5.875 GHz.

4. The air-to-ground communications system according to claim 1 wherein the at least one wide antenna beam covers a range of 20-70 degrees, and wherein the at least one narrow antenna beam covers a range of 5-15 degrees.

5. The air-to-ground communications system according to claim 1 wherein the control information comprises allocation for downlink and uplink scheduling with the aircraft.

6. The air-to-ground communications system according to claim 1 wherein the control information comprises system information messages.

7. The air-to-ground communications system according to claim 1 wherein the data traffic comprises email and text messaging services.

8. The air-to-ground communications system according to claim 1 wherein said controller is configured to be coupled to an Internet service provider (ISP).

9. The air-to-ground communications system according to claim 1 wherein said controller is configured to be coupled to a public switched telephone network (PSTN).

10. The air-to-ground communications system according to claim 1 wherein said ground-based transceiver comprises a direct-conversion transceiver.

11. The air-to-ground communications system according to claim 1 wherein said beamforming network is configured to digitally form the at least one narrow and wide antenna beams.

12. An air-to-ground communications system comprising:
at least one base station to be positioned on the ground and comprising
a ground-based transceiver configured to operate in an unlicensed frequency band to provide data traffic and control information to an aircraft, with the data traffic comprising email and text messaging services and the control information comprising allocation for downlink and uplink scheduling with the aircraft,
a phased array antenna coupled to said ground-based transceiver,
a beamforming network coupled to said ground-based transceiver and configured to simultaneously generate at least one narrow antenna beam for the data traffic and at least one wide antenna beam for the control information, the at least one wide antenna beam having a lower antenna gain and a lower data rate as compared to the at least one narrow antenna beam and,
a controller coupled to said beamforming network and configured to control a sum of simultaneously transmitted power of the at least one antenna narrow beam for data traffic and the at least one wide antenna beam for the control information.

13. The air-to-ground communications system according to claim 12 wherein the unlicensed frequency band is within a frequency range of at least one of 2.4 GHz to 2.5 GHz and 5.725 GHz and 5.875 GHz.

14. The air-to-ground communications system according to claim 12 wherein the at least one wide antenna beam covers a range of 20-70 degrees, and wherein the at least one narrow antenna beam covers a range of 5-15 degrees.

15. The air-to-ground communications system according to claim 12 wherein the control information further comprises system information messages.

16. The air-to-ground communications system according to claim 12 wherein said controller is configured to be coupled to an Internet service provider (ISP).

17. The air-to-ground communications system according to claim 12 wherein said controller is configured to be coupled to a public switched telephone network (PSTN).

18. A method for operating an air-to-ground communications system comprising at least one base station to be positioned on the ground and comprising a ground-based transceiver to provide data traffic and control information to an aircraft, a phased array antenna coupled to the ground-based transceiver, a beamforming network coupled to the ground-based transceiver, and a controller coupled to the beamforming network, the method comprising:
operating the beamforming network to simultaneously generate at least one narrow antenna beam for the data traffic and at least one wide antenna beam for the control information, the at least one wide antenna beam having a lower antenna gain and a lower data rate as compared to the at least one narrow antenna beam; and
operating the controller to control a sum of simultaneously transmitted power of the at least one antenna narrow beam for data traffic and the at least one wide antenna beam for the control information.

19. The method according to claim 18 wherein the ground-based transceiver is configured to operate in an unlicensed frequency band.

20. The method according to claim 19 wherein the unlicensed frequency band is within a frequency range of at least one of 2.4 GHz to 2.5 GHz and 5.725 GHz and 5.875 GHz.

21. The method according to claim 18 wherein the at least one wide antenna beam covers a range of 20-70 degrees, and wherein the at least one narrow antenna beam covers a range of 5-15 degrees.

22. The method according to claim 18 wherein the control information comprises allocation for downlink and uplink scheduling with the aircraft.

23. The method according to claim 18 wherein the control information comprises system information messages.

24. The method according to claim 18 wherein the data traffic comprises email and text messaging services.

25. The method according to claim 18 wherein the controller is configured to be coupled to an Internet service provider (ISP).

26. The method according to claim 18 wherein the controller is configured to be coupled to a public switched telephone network (PSTN).

27. An air-to-ground communications system comprising:
at least one base station to be positioned on the ground and comprising
a ground-based transceiver configured to provide data traffic and control information to an aircraft,
a phased array antenna,
a beamforming network cooperating with said ground-based transceiver and said phased array antenna to simultaneously generate at least one narrow antenna beam for the data traffic and at least one wide antenna beam for the control information, the at least one wide antenna beam having a lower antenna gain and a lower data rate as compared to the at least one narrow antenna beam, and a controller coupled to said beamforming network and configured to control a sum of simultaneously transmitted power of the at least one antenna narrow beam for data traffic and the at least one wide antenna beam for the control information.

28. The air-to-ground communications system according to claim 27 wherein said ground-based transceiver is configured to operate in an unlicensed frequency band.

29. The air-to-ground communications system according to claim 27 wherein the at least one wide antenna beam covers a range of 20-70 degrees, and wherein the at least one narrow antenna beam covers a range of 5-15 degrees.

30. The air-to-ground communications system according to claim 27 wherein the control information comprises allocation for downlink and uplink scheduling with the aircraft.

31. The air-to-ground communications system according to claim 27 wherein the control information comprises system information messages.

32. The air-to-ground communications system according to claim 27 wherein the data traffic comprises email and text messaging services.

\* \* \* \* \*